United States Patent [19]
Eriksson

[11] Patent Number: 5,486,784
[45] Date of Patent: Jan. 23, 1996

[54] METHOD AND DEVICE FOR GENERATION OF CLOCK SIGNALS

[75] Inventor: Karl Ö. Eriksson, Askim, Sweden

[73] Assignee: Telefonaktiebolaget LM Ericsson, Stockholm, Sweden

[21] Appl. No.: 346,915

[22] Filed: Nov. 23, 1994

[30]   Foreign Application Priority Data

Nov. 26, 1993   [JP]   Japan ................... 9303922-0

[51] Int. Cl.⁶ .................................................. H03K 5/01
[52] U.S. Cl. .................. 327/165; 327/447; 327/151; 327/156; 377/78; 375/372; 365/233
[58] Field of Search .................. 375/372; 377/78; 327/147, 151, 156, 165; 365/233

[56]           References Cited

U.S. PATENT DOCUMENTS

| | | | |
|---|---|---|---|
| 4,270,183 | 5/1981 | Robinson et al. | 364/900 |
| 4,434,498 | 2/1984 | Mathieu | 375/114 |
| 4,612,636 | 9/1986 | Grover et al. | 370/94 |
| 4,718,074 | 1/1988 | Mannas et al. | 375/118 |
| 4,805,139 | 2/1989 | Norris | 377/78 |
| 4,835,481 | 5/1989 | Geissler et al. | 327/156 |
| 5,007,070 | 4/1990 | Chao et al. | 375/118 |
| 5,027,351 | 6/1991 | De Prycker et al. | 370/94.1 |
| 5,119,093 | 6/1992 | Vogt et al. | 341/123 |
| 5,133,064 | 7/1992 | Hotta et al. | 327/156 |
| 5,168,492 | 12/1992 | Beshai et al. | 370/60.1 |

FOREIGN PATENT DOCUMENTS 360721   3/1990   European Pat. Off. .

*Primary Examiner*—Margaret Rose Wambach
*Attorney, Agent, or Firm*—Burns, Doane, Swecker & Mathis

[57]             ABSTRACT

A method and a device for regenerating clock rate information in which data is intermediately stored in a memory to which the data is read at a first rate and out of which the data is read at a second rate. The difference between two levels of the amount of data stored in the memory is determined, after which the difference is compared with a reference value. The result from the comparison affects the second rate so that, at subsequent measurements of the difference, the difference between it and the reference value shall decrease.

15 Claims, 1 Drawing Sheet

METHOD AND DEVICE FOR GENERATION OF CLOCK SIGNALS

TECHNICAL FIELD

The present invention relates to a method for regeneration of clock rate information.

The invention also relates to a device for recreating clock rate information.

BACKGROUND OF THE INVENTION

An often used method for transmitting data in a data transmission network is to pack (multiplex) the information together with other information from other data sources and transmit data in the form of packets over a transmission channel. This means that the transmission medium is used in a more effective way and that the transmission costs are reduced. In general, data is transmitted through the network at higher clock rates as compared to the clock rate of the original data source. When the information is received it is required that the original clock information is regenerated.

A common method for achieving this is to store data intermediately in a FIFO (First In First out) memory. Out of this memory, data may then be read at a rate which corresponds to the original rate. An oscillator of the VCO type (voltage Controlled Oscillator) or the VCXO type (Voltage Controlled X-tal (Crystal) Oscillator) is often used for generating clock pulses for the read-out. The control voltage of the oscillator will then be proportional to the content level of the FIFO memory, i.e. the larger amount of data in the FIFO memory, the higher read-out rate.

Some common problems associated with this device is to obtain sufficiently jitter-free clock pulses with a reasonable depth of the FIFO, and that the information regarding the content level in most cases is not available in standard FIFO components. Another problem which arises when the transmission channel transmits a data packet into the FIFO is that the content level momentarily increases and leads to a quick increase of the read-out rate. Thereafter, no data arrives at the FIFO during a period, whereby the clock rate decreases until another data packet arrives, and so on. This is repeated periodically and leads to variations in the rate of the read-out clock (jitter).

In order to counteract this, it is common to increase the depth of the FIFO memory and to filter the control signal. The drawback with this is that the solution becomes more complex (deeper FIFO) and, because of the fact that the control signal is more heavily filtered, that the oscillators (VCXO/VCO) will experience difficulties in following the natural rate variations which may occur in the data signal.

The FIFO's which are available on the market today are often provided with "flags" which denote the content level of the memory, typically ½, ¾ and ¼. These flags may be utilized when regenerating the clock rate, but in order to get this regenerating to work satisfactorily there is required a considerably higher resolution, which implies adding external circuits.

Several devices are known which utilize the flags of the FIFOs'. In U.S. Pat. No. 5,007,070, the flags are utilized so that when the content level of the FIFO is greater than ¾, the read-out rate is increased until the content level decreases to below the ½ value. In a corresponding way the rate is decreased if the content level becomes less that ¼ until the content level exceeds the ½ value. When the content level is between ¼ and ¾, the rate is not changed.

In the device according to U.S. Pat. No. 4,270,183, the content level of the FIFO is controlled, and by means of a ½ value a counter is "synchronized", which counter controls the total content level in the FIFO. The value of the counter controls a rate-supplying VCO via a digital/analog converter.

Use of these known devices in a packet data network is however unsuitable since these devices also suffer from the drawback that if the data amount which has been read varies heavily, for example through the fact that data is received in the form of packets, the amount of data in the form of the number of bits in the FIFO will instantaneously increase heavily. Due to the fact that the known methods measure the data amount more or less continously in the FIFO, and thereby control the read-out clock, the control signal to the read-out clock will instantaneously increase heavily, even though there is an attempt to filter it to a certain limit.

The object of the present invention is thus to eliminate the above-mentioned problems by means of a method and a device for regenerating a clock rate which generates clock pulses for the read-out of data which to the greatest possible extent is free from jitter and which is not instantaneously affected by data sets which vary in packet data networks in the memory which is utilized for inter-mediate data storage.

SUMMARY OF THE INVENTION

The object is achieved by means of a method for regenerating a clock rate information wherein data is intermediately stored in a memory to which the data is read at a first rate out of which the data is read at a second rate.

The object is also achieved by means of a device for regenerating a clock rate information wherein data is intermediately stored in a memory to which the data is read at a first rate and out of which the data is read at a second rate, wherein the device is comprised of a counter device, a comparator and a clock pulse generating device.

PREFERRED EMBODIMENT

The method for regenerating clock rate information which is proposed by the invention is based on the fact that data is intermediately stored in a memory to which data is read at a first rate and out of which data is read at a second rate. According to the present invention the difference between two levels of the amount of data stored in the memory (the content level) is determined;

the difference is compared with a reference value; and the result of the comparison is made to affect the second rate so that at subsequent measurements of the difference, the difference between it and the reference value shall decrease one.

One of the two levels is either the amount of data stored in the memory when a reading of the data at the first rate is terminated, or the corresponding level when the reading at the first rate is commenced.

The second of the two levels is a level at which the memory gives an indication that the amount of data stored in the memory has reached a certain level.

If the difference between the level on which the reading of the data has finished and the indicated level are greater than the reference value, the second rate shall be increased, and if the difference is less than the reference value, the second rate shall be decreased.

If the difference between the level on which the reading is started and the indicated level is determined, the second rate shall be decreased if the difference is greater than the reference value and the second rate shall be increased if the difference is less than the reference value.

Figure 1:
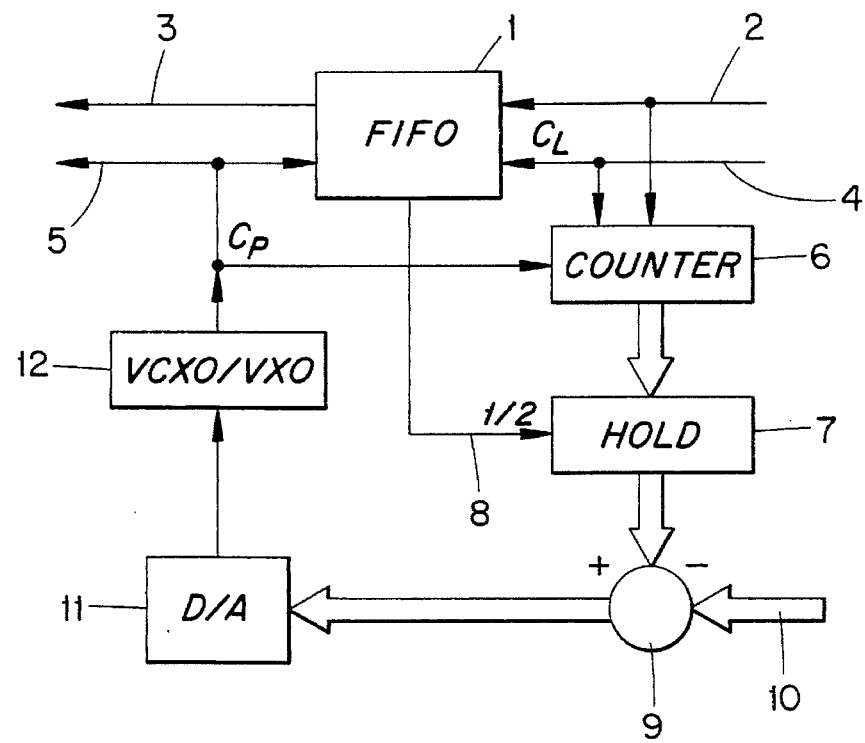
FIG. 1 shows a block diagram of a preferred embodiment of the invention.

In order to exemplify the method, in the following there is described with reference to FIG. 1 a preferred embodiment of a device according to the invention.

The device comprises a memory 1, for example a FIFO, to which data is supplied in the form of packets from a transmission channel along the conductor 2. Data is outputted from the FIFO via the conductor 3. The FIFO is supplied with clock signal pulses through the conductor 4 for a reading $C_1$ and clock signal pulses through the conductor 5 for a read-out $C_p$. In this regard it should be noted that the word "conductor" signifies different types of electrical connectors, from single "wires" to complex bus systems.

The data packets from the transmission channel and clock pulses for the read-out are also supplied to a counter device consisting of a counter 6 (Counter), the output of which is connected to a hold circuit (Hold) 7. An indication ("flag") ½ is transmitted to the hold circuit via the conductor 8, which indication signifies that the content level of the FIFO is <50%.

The output value from the hold circuit is compared with a reference value in a comparator 9. The difference between the compared signals constitutes a control signal and is converted in a digital/analog converter (D/A) 11 to an analogous form which thereafter controls the frequency of a clock pulse generating device which may be a voltage controlled (crystal) oscillator (vco/vcxo) 12. The output signal from this oscillator constitutes the above-mentioned clock pulses $C_p$ for the read-out.

The function of the device during a function cycle will now be described.

A data packet which is received from the transmission channel is read into the FIFO 1 with the clock pulses $C_1$ on the conductor 4. The size of the packet is assumed to be of the kind where the FIFO's content level after the read-out exceeds 50%. When the reading terminates, this is detected by the counter 6, which is then set to zero. Thereafter, the data is read out of the FIFO by means of the clock pulses $C_p$. The counter 6 counts the clock pulses $C_p$, adding the value in the counter with "one" for each clock pulse. This continues until the amount of data (the content level) in the FIFO has decreased so much that the flag ½ is activated. When this occurs, the content of the counter is "frozen" by means of the hold circuit 7.

The hold circuit now contains the number of clock pulses which was required in order to empty the FIFO to half the size and which thus corresponds to the difference between the content level of the FIFO at the time when the reading of the data is finished, and the content level when there is an indication of the flag ½. This difference is compared in the comparator 9 with the reference value 10. If the reference value is greater than the difference (the FIFO contains too little data), the control signal is negative.

Thereafter, the control signal controls the frequency of the oscillator 12 via the D/A converter 11 to a lower rate, through which a smaller amount of data will be read out during the next function cycle.

Conversely, if the reference value is less than the difference, the control signal becomes positive and the read out rate is increased, resulting in a larger amount of read out data.

When a new function cycle is started through the reading of a new data packet into the memory, the content level at the end of the reading will thus be changed due to the changed read-out rate. The difference between the difference and the reference value will then become smaller and the device will control, in a steady state, the difference towards "zero".

It should be noted that the control signal to the oscillator is not controlled directly by the content level of the FIFO at each moment, but instead by the number of clock pulses which are required in order to empty the FIFO to a certain level. This means that the control signal lacks the variations which are typical for systems with a control signal which is directly dependent on the content level of the FIFO.

Furthermore, the device requires only information concerning whether the content level of the FIFO has reached a certain level, i.e. a simple indication/flag which is common in this type of components. By means of the device, the weaknesses involved in the traditional solutions are eliminated. There is therefore no risk of the counter loosing control of the content level of the FIFO.

Figure 2:
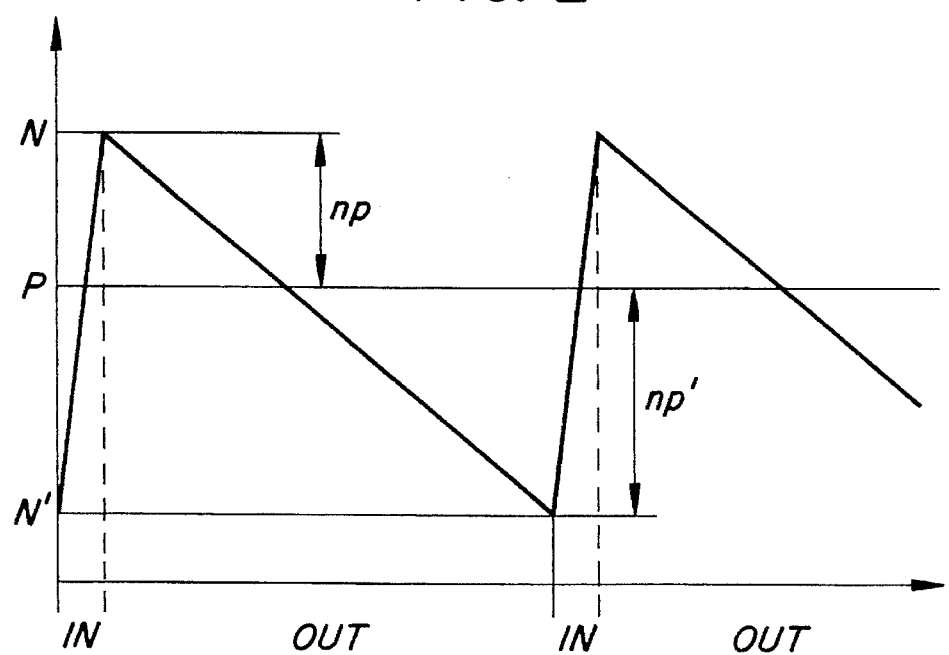
FIG. 2 shows in the form of a diagram how the amount of data in the FIFO varies in a device according to the invention.

In order to further explain the function of the device, with reference to FIG. 2 there is derived an expression of the control signal (CONTROL) as a function of the maximum content level (N) of the FIFO at a certain moment, the reference value (M) and the amount of data in the form of the number of bits during indication (=P, i.e. in the described embodiment that the FIFO is half-full).

In the diagram according to FIG. 2, the X-axis constitutes a time axis on which the intervals IN denote the time intervals during which the data is read into the FIFO, whereas OUT denotes the time intervals between the readings during which only a read-out of data takes place. The Y-axis of the diagram denotes the content level of the FIFO in the form of the number of bits.

When the reading to the FIFO terminates, the number of bits N in the FIFO and the counter are set to zero. When the contents in the FIFO are thereafter decreased through read-out to the limit for the indication P, the counter is assumed to have the value $n_p$, the contents of the FIFO is given by:

$$P = N - n_p \tag{1}$$

Thereafter, the control signal may be denoted:

$$\text{CONTROL} = n_p - M$$

and expression (1) may be used to obtain $n_p$:

$$\text{CONTROL} = N - P - M \tag{2}$$

A suitable value for M (the reference value) may now be calculated so that the FIFO is used in an optimal way, i.e. half-full on average. When the device is in the steady state, CONTROL=0. The expression (2) may then be denoted as $$N = P + M \tag{3}$$

and, if the packet length is assumed to be B and the maximum content level shall be $$N = P + B/2 \tag{4}$$

there is obtained by a combination of the expressions (3) and (4):

$$M=B/2 \quad (5)$$

which means that the reference signal should be chosen to be equal to half the size of the packets and that the smallest size of the FIFO, when using the FIFO optimally, is:

$$FIFO_{size}=\pm N=[\text{according to (4)}]=P+B/2-(P-B/2)=B$$

i.e., that the theoretically smallest size of the FIFO equals the size of the packets being transmitted.

The above-described device presents several advantages in relation to conventional devices, amongst others a lower demand for filtering of the control signal of the oscillator, a lower demand of depth of the FIFO, use of standard FIFO components will be simplified, which leads to cheaper and less complex designs.

In the introduction of the description, it was assumed that the packet length is so large that the content level of the FIFO exceeds 50% after the reading. If this is not the case, there will be no flag/indication ½ during the read-out and thereby no value of the amount of data being read out. For this mode of operation, it is therefore necessary to add a control logic (not shown) to the device. The control logic senses the flag ½ at the finish of the reading, and if a content level of 50% has not been achieved, a control signal is connected to the clock pulse generating device which controls its clock frequency to a lower rate, whereby the content level of the FIFO will increase for each reading until it reaches above the 50% level. When this steady state has been obtained, the device functions as has been described above.

The control logic is not described here since it may be designed in many ways with use of known technology/prior art and without presenting any difficulties for the skilled person.

According to another preferred embodiment of the invention, the counter device determines the difference ($n_p$, see FIG. 2) between the FIFO's content level (N, see FIG. 2) when the reading to the FIFO starts and its content level (P) when the flag ½ is indicated. In this case, the counter 6 counts the clock pulses for the reading $C_1$. Otherwise, this device functions analogous to the above-mentioned device.

A digital-analog conversion of the difference is not necessary in order to achieve the invention. Consequently, the clock pulse generating device may be designed for a digital control, in which case the digital/analog converter 11 is omitted.

In order to further improve the jitter properties of the device, the difference may be filtered (analog or digitally) before it is added to the clock pulse generating device.

The invention is not limited to the described embodiments, but may be varied freely within the scope of the appended claims.

I claim:

1. A method for regenerating clock rate information wherein data is intermediately stored in a memory to which the data is read at a first rate and out of which the data is read at a second rate, comprising the steps of:

determining a difference between two levels of an amount of data stored in the memory, wherein one of said two levels is a level at which the memory provides an indication that the amount of data stored in the memory has reached a certain level;

comparing the difference with a reference value; and changing the second rate based on said comparison so that at subsequent measurements of the difference, the difference between the two levels of data and the reference value shall decrease.

2. The method according to claim 1, wherein the second of said two levels is the level stored in the memory when a reading of the data at the first rate is terminated.

3. The method according to claim 1, wherein the second of said two levels is the level stored in the memory when a reading of the data at the first rate staffs.

4. The method according to claim 2, wherein the second rate is increased if said difference is greater than the reference value, and that the second rate is decreased if said difference is less than the reference value.

5. The method according to claim 3, wherein the second rate is decreased if said difference is greater than the reference value, and that the second value is increased if said difference is less than the reference value.

6. A device for regenerating clock rate information in which data is intermediately stored in a memory to which the data is read at a first rate and out of which the data is read at a second rate, said device comprising:

a counter device which determines a difference between two levels of an amount of data stored in the memory and one of said two levels is a level at which the memory provides an indication that the amount of data stored in the memory has reached a certain level;

a comparator in which the difference determined by the counter device is compared with a reference value for generating a control signal; and a clock pulse generating device which emits clock pulses at the second rate, wherein the rate is controlled by the control signal.

7. The device according to claim 6, wherein the second of said two levels is the amount of data stored in the memory when the reading of the data at the first rate is terminated.

8. The device according to claim 6, wherein the second of said two levels is the amount of data stored in the memory when the reading of the data at the first rate starts.

9. The device according to claim 7, wherein the second rate is increased if said difference is greater than the reference value, and that the second rate is decreased if said difference is less than the reference value.

10. The device according to claim 8, wherein the second rate is decreased if said difference is greater than the reference value, and that the second value is increased if said difference is less than the reference value.

11. The device according to claim 6, wherein the counter device determines said difference by determining the number of clock pulses which have been added to the memory in order to change the amount of data stored in the memory between the two levels.

12. The device according to claim 6, wherein said memory is a First In First Out FIFO memory.

13. The device according to claim 6, wherein the clock pulse generating device is a voltage controlled oscillator or a voltage controlled crystal oscillator.

14. The device according to claim 6, wherein the control signal is filtered before it is supplied to the clock pulse generating device.

15. The device according to claim 6, wherein said device receives data from a packet transmitting network.

\* \* \* \* \*